W. T. SMITH.
PROCESS OF EXTRACTING METALS FROM THEIR ORES.
APPLICATION FILED MAY 24, 1907.
926,718.
Patented June 29, 1909.
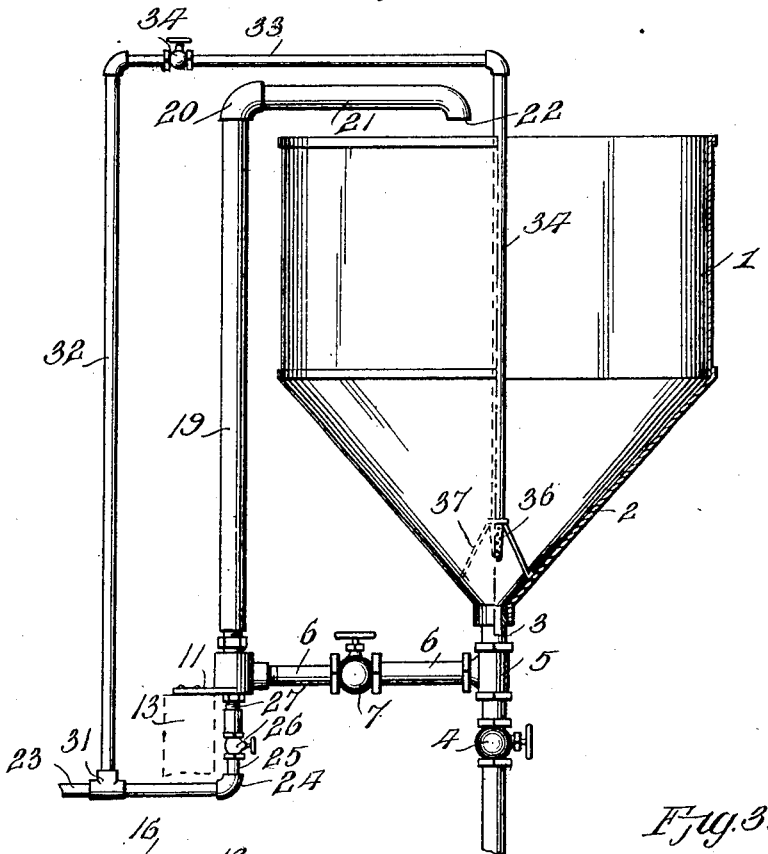
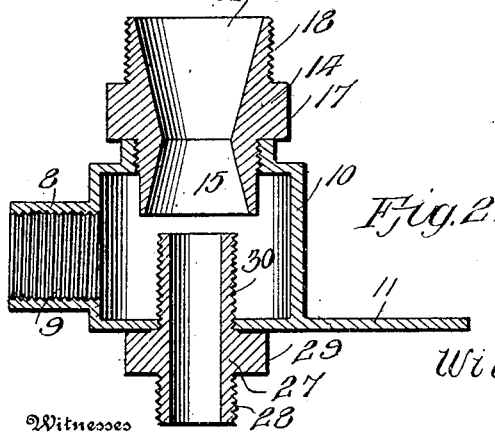
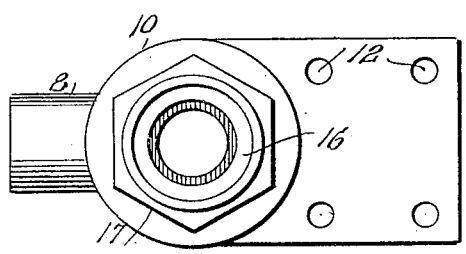
Inventor
William Townsend Smith,
By Victor J. Evans
Attorney
Witnesses
Frank Hough

UNITED STATES PATENT OFFICE.

WILLIAM TOWNSEND SMITH, OF LOS ANGELES, CALIFORNIA.

PROCESS OF EXTRACTING METALS FROM THEIR ORES.

No. 926,718.   Specification of Letters Patent.   Patented June 29, 1909.

Application filed May 24, 1907. Serial No. 375,552.

*To all whom it may concern:*

Be it known that I, WILLIAM TOWNSEND SMITH, a citizen of the United States, residing at Los Angeles, in the county of Los Angeles and State of California, have invented new and useful Improvements in Processes of Extracting Metals from Their Ores, of which the following is a specification.

The invention relates to a process of extracting metals from their ores, or other materials, being primarily directed to those processes employing chemical solvents, and serving in use to materially increase the necessary chemical reaction and shorten the time ordinarily required for the extraction of the metals.

In those chemical processes which the present invention is designed to improve it is highly desirable to thoroughly agitate the mixture of ore and solution during the chemical reaction, and this has heretofore been ordinarily carried out by the means of mechanical stirrers. Furthermore, all such reduction processes with which I am familiar have handled the solution at practically the temperature of the atmosphere, depending for results upon the reaction of the solvent in the usual cold state.

The main object of the present process is, therefore, to maintain a continuous circulation of the solution and the mineral slimes suspended therein, and to utilize the circulating force as a heating medium for the solution and the mineral in suspension, whereby the use of all mechanical agitators is dispensed with, and the solvent effect of the chemicals materially increased through their heated condition.

In carrying out the present process I provide the usual charging tank with a circulatory channel or conduit leading from the tank below the level of the solution therein and discharging into the tank above said level. This conduit is in the form of a siphon, and is in connection, below the level of the solution in the tank with a pressure pipe, through which superheated steam is directed into the circulatory conduit. The pressure of the steam tends to maintain an even constant circulation of the solution through the tank, and at the same time subject said solution to a high degree of heat.

In connection with the present process it is to be particularly noted that the one agent, preferably superheated steam provides both the necessary agitation of the solution and the heating thereof, so that in effect the present process may be said to consist in inducing a continuous circulation of the solution under the pressure of and through the commingling therewith of superheated steam.

As an illustration of a simple form of apparatus whereby the present process may be conveniently carried out, reference is had particularly to the accompanying drawings, in which:—

Figure 1 is a side elevation, partly in section of the apparatus. Fig. 2 is an enlarged central vertical section of the siphon connection, Fig. 3 is a plan of the same.

In the drawings, wherein similar reference numerals indicate like parts throughout the several views, 1 designates a charging tank, which may be of any desired construction or size, being preferably, however, formed with a converging lower end 2, in communication at the relatively lowest point with a refuse discharge pipe 3, valved at 4.

Between the tank and valve the discharge pipe is provided with a T-coupling to which is connected one branch 6 of the circulatory conduit, said pipe 6 being also valved at 7. The outer terminal of the branch 6 is in communication with a siphon casing 10, as shown. The siphon casing, so far as the purposes of the present invention are concerned, may be of any detailed structure, being preferably, however, in the form of a cylindrical casing provided with a laterally extending nipple 8 interiorly threaded at 9 to receive one end of the branch 6. The relatively lower portion of the casing has a laterally projecting flange 11 formed with openings 12 whereby the casing and connected parts may be conveniently supported upon a beam or other fixture 13. The relatively upper portion of the casing is formed with an outlet to permit the steam tight connection of a nozzle 14, the relatively lower end of which extends within the casing and is interiorly flared in a downward direction, as at 15, the bore of the nozzle above the intake 15 being outwardly flared at 16. The second section of the circulatory conduit, as a pipe 19 is arranged for threaded connection exteriorly of the upper end of the nozzle, the upper end of said pipe 19 having an elbow connection 20 through which the third or final section of the circulatory conduit 21 is connected in communication with the pipe 19. The free or delivery end of the section 21 overlies the tank 1, being preferably downwardly turned to provide a discharge mouth 22 through which the solution is discharged directly into the tank.

A pressure pipe 23, leading from any suitable source of superheated steam supply, is provided adjacent the siphon casing with an elbow 24, from which an inlet pipe 25, valved at 26, extends toward the casing. An intake nozzle 27 is threaded into an opening in the relatively lower wall of the siphon casing, the bore of the intake nozzle alining with the bore of the nozzle 14. The intake nozzle extends within the casing, and that portion of said nozzle beyond the casing is exteriorly threaded at 28 to receive the upper end of the inlet pipe 25. Both the nozzle 14 and the nozzle 27 are formed with wrench faces 17 and 29 respectively to permit adjustment of the respective nozzles in the casing to insure a proper siphonage under a particular steam pressure.

Beyond the siphon casing connection the pressure pipe 23 is provided with a T-coupling 31, from which extends a pipe conduit including a section 32, a section 33, valved at 34, and a section 35, the latter depending within the tank and terminating near the bottom thereof in a perforated nozzle 36, the lower end of the pipe being supported in a bracket 37 secured within the tank.

In operation a quantity of solution with ore in suspension is introduced into the charging tank, the valve 4 is closed and the valves 7, 26, and 34 are opened. Superheated steam is then introduced into the siphon casing, acting to siphon the contents of the tank through a portion of the discharge pipe 3, through the circulatory conduit, and into the tank at the upper end. The solution is thus kept in continuous circulation with the result of thoroughly agitating the same, and the superheated steam also imparts to the solution in passing through the circulatory conduit that degree of heat that will most effectively promote the chemical reaction of the solvent used.

When the agitation is completed, the valves 7, 26 and 34 are closed and the slime is allowed to settle until the solutions on top are perfectly clear, when said solutions may be decanted or siphoned into another tank or vessel and precipitated in any desired manner. After the solution has been decanted, the valve 4 may be opened and the slimes discharged to waste. The auxiliary conduit leading to the bottom of the tank forms a simple means of utilizing the superheated steam for loosening any slimes or sand which may cake at the bottom of the tank, thereby providing a means for insuring a perfect circulation in the carrying out of the process.

The present process, that of simultaneously agitating and heating the solutions is productive of many advantages and desirable results over other processes now in use. For example, through the increased chemical reaction induced by the heat and thorough agitation, I am enabled to secure a materially increased extraction of the metal as compared with other processes of the same time of exposure and agitation. Furthermore, the heating of the solution materially increases the solvent effect of the chemicals, so that a more thorough and rapid chemical reaction results. The saving of time by the present process will average from seventy-five to eighty per cent. over similar processes, thereby increasing the production of each tank used and reducing the extent of agitation and also the time required for settling, as by the heated condition of the solution, the slimes, mud, and other elements held in suspension will settle more compactly and more quickly than in the cold solution. Again by the use of the steam siphons and injectors described, considered solely as a means of agitation, I am enabled to materially decrease the initial cost of a plant, as by such agitation all mechanical stirrers, such as centrifugal pumps or the like, and their accompanying mechanical elements are eliminated. These parts constitute one of the largest running expenses of a reducing plant, and their complete elimination reduces power expenses, initial cost of installation, and a reduced number of operators.

The use of the superheated steam has another material advantage in addition to its importance in treating the solution. That is by the use of such agent all possibility of freezing of the solution, and the resultant bursting of pipes and connections is avoided. Also the steam will tend to heat the building in which the plant is located and maintain an even temperature best suited for the solutions and for effective work by the employees.

It is to be understood that the present process contemplates the use of superheated steam. This insures a proper heating of the solution and in addition thereto avoids an unnecessary degree of condensation, which would tend to weaken the strength of the solution and take up room in the tank that could be utilized by ore slimes.

The salient feature of the present process is the use of superheated steam as a means for agitating the contents of the tank and also for heating the solutions in the tank. The mechanical feature of the process, namely the siphons and injectors are intended to represent a simple means to an end, it being understood that any mechanical means whereby the superheated steam may be used for the purposes enumerated may be substituted for the specific elements described.

The present process is primarily directed to the extraction of metals from their ores, or other material, in which cyanid of potassium, or cyanid of sodium is used as the solvent. It is fully apparent, however, that the process is equally applicable to practically any chemical or metallurgical process for the reduction of ores or the like, in which agitation of the solution and heating of the same is desirable.

Having thus described the invention what is claimed as new, is:—

1. The herein described process of leaching ores consisting in simultaneously effecting a circulation and a heating of a cyanid solution through the introduction of superheated steam into the circulatory channel remote from the main body of the solution.

2. The herein described process of leaching ores consisting in introducing superheated steam into a circulatory channel in open communication with a tank containing a cyanid solution, said steam serving as the sole heating and circulation compelling agent.

In testimony whereof, I affix my signature in presence of two witnesses.

WILLIAM TOWNSEND SMITH.

Witnesses:
JOHN L. FLETCHER,
ARTHUR L. EVANS.